(12) United States Patent
Potier

(10) Patent No.: US 6,870,819 B1
(45) Date of Patent: Mar. 22, 2005

(54) DEVICE FOR EXCHANGING RADIO SIGNALS PROVIDED WITH TIME MARKERS FOR SYNCHRONIZING CLOCKS

(75) Inventor: Thierry Potier, Auffargis (FR)

(73) Assignee: Thomas CSF Detexis (FR)

( * ) Notice: Subject to any disclaimer, the term of this patent is extended or adjusted under 35 U.S.C. 154(b) by 0 days.

(21) Appl. No.: 09/422,944

(22) Filed: Oct. 22, 1999

(30) Foreign Application Priority Data

Oct. 27, 1998 (FR) ............................................ 98 13444

(51) Int. Cl.⁷ ............................ H04B 7/212; H04J 3/06
(52) U.S. Cl. ...................... 370/324; 370/507; 370/509
(58) Field of Search ................................ 370/507, 316, 370/324, 514, 509, 510, 512, 520, 515, 503, 350, 280; 375/367, 358

(56) References Cited

U.S. PATENT DOCUMENTS

| | | | |
|---|---|---|---|
| 3,798,650 A | | 3/1974 | McComas et al. |
| 5,410,588 A | * | 4/1995 | Ito ............................. 370/350 |
| 5,697,051 A | | 12/1997 | Fawcett |
| 5,796,726 A | * | 8/1998 | Hassan et al. ............. 370/324 |
| 6,016,311 A | * | 1/2000 | Gilbert et al. .............. 370/280 |

FOREIGN PATENT DOCUMENTS

FR  2 726 412  5/1996

OTHER PUBLICATIONS

Kirchner, Dieter, "Two–Way Time Transfer Via Communication Satellites", Proceedings of the IEEE, vol. 79, No. 7, Jul. 1991, pp. 983–989.

* cited by examiner

Primary Examiner—Chau Nguyen
Assistant Examiner—Soon D. Hyun
(74) Attorney, Agent, or Firm—Connolly, Bove, Lodge & Hutz LLP

(57) ABSTRACT

Radio transmission of chronometric information. A device comprising an antenna (A1, A2) to which there are coupled on one hand a generator (G1, G2) generating a signal to be sent (e1, e2) and a reception processing circuit (C1, C2), capable of processing a received signal (r1, e2) where the signals exchanged have the same carrier frequency. Separate time segments are generated with successive random positions. Transmission is enabled only during these time segments, whilst reception is enabled only outside these segments, making it possible to use the time markers of the signals without any effect of recurrent masking of the reception signal by the transmission signal.

21 Claims, 6 Drawing Sheets

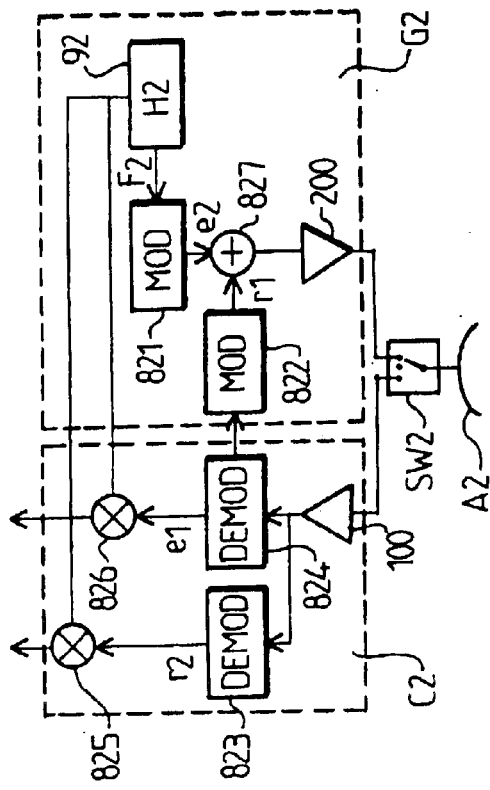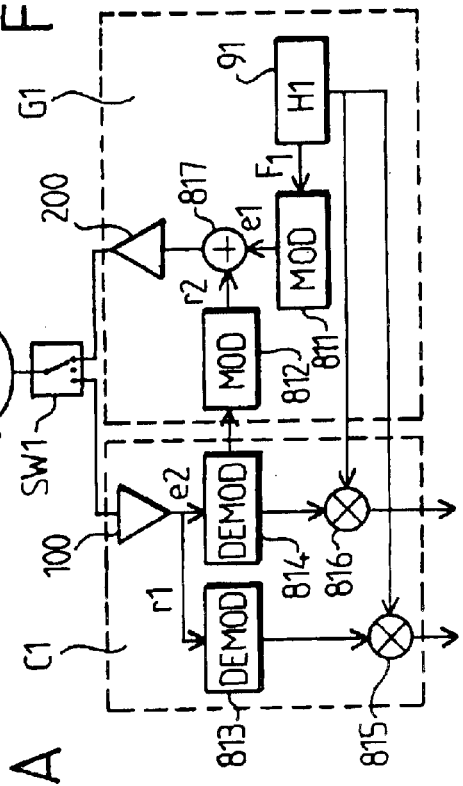
FIG.3B
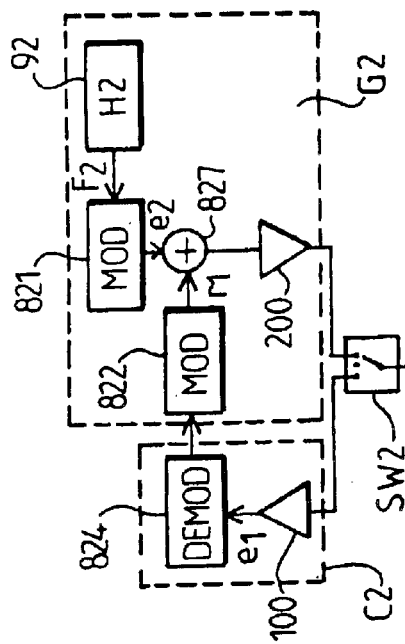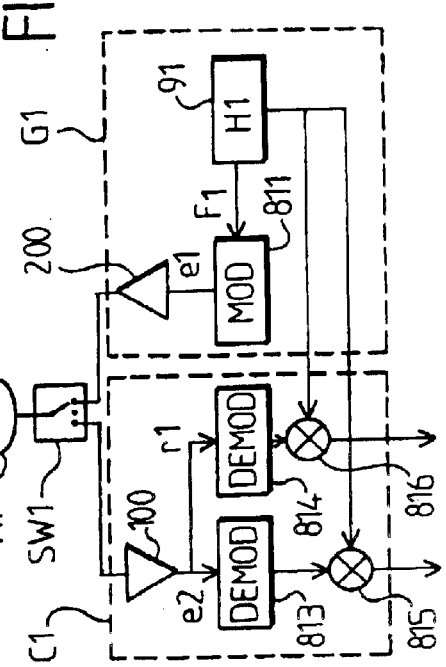
FIG.3A

DEVICE FOR EXCHANGING RADIO SIGNALS PROVIDED WITH TIME MARKERS FOR SYNCHRONIZING CLOCKS

BACKGROUND OF THE INVENTION

The invention concerns apparatus and methods for the radio transmission of chronometric information.

In order to transmit chronometric pips by radio, use is normally made of a carrier wave provided with a repetitive pattern forming a time marker, equivalent to a brief pulse. The time marker is for example a code of the pseudo-random or "pseudo-noise" type.

It is advantageous to apply this technique to the synchronization of very precise clocks, one being situated for example on the ground and the other on board a satellite. It is a case of precisely measuring the time difference between the respective transitions of these atomic clocks. More generally, it is a case of seeking the time difference between two contemporary events occurring in stations which are distant in space, the word "station" not implying a stationary position here.

One of the stations transmits to the other a time marker related to its own event. Subject to knowing the actual transit time of the waves, the difference measured at the other station between the time marker received and the local event (or a time marker linked to it) gives access to the required time difference. In addition, it can be arranged so that the carrier is frequency linked to the time marker where the phase carrier improves precision.

In order to know the distance travelled by the radio waves, a second transmission is needed in both directions. In the majority of cases, this second transmission must take place at the same time as the first. It will therefore be possible to have two transmissions and one reception for one of the stations, but the other station is the origin of one transmission and two receptions.

In addition, the transmission medium is rarely perfect, and often dispersive. In particular, in the case of an earth-satellite transmission, strong interference is observed when passing through the ionosphere and troposphere. This interference is variable in the short term, and dispersive, with the ionosphere.

The conventional solution consists of using different carrier frequencies for the two transmissions. However, this poses problems, notably with regard to the allocation of frequencies.

There therefore remains only the possibility of effecting the two transmissions with the same carrier frequency. However, this implies shared time, always tricky because of the risk of interference. In addition, since the transit time of the waves between the two stations is greater than the period of recurrence of the time marker, it will happen that the received signal coincides with a moment of transmission, and will therefore be lost by masking, which is unacceptable.

There therefore exists currently no truly satisfactory solution for the radio exchange of chronometric signals between two distant stations.

SUMMARY OF THE INVENTION

The present invention improves the situation. It starts from a device comprising radio transmission/reception means, to which there are coupled on the one hand a generator generating a signal to be transmitted, and on the other hand a reception processing circuit, capable of working on a received signal.

The invention keeps the idea of making the radio transmission/reception means work substantially on the same carrier frequency in transmission and in reception.

It overcomes the aforementioned difficulties by making provision for defining separate time segments, whose positioning in time (start and/or end) is substantially random. Transmission is enabled only during these time signals, whilst reception is enabled only outside said signals. This makes it possible to use the time markers of the signals without the effect of masking of the reception by the recurrent transmission.

To this end, the device according to the invention can comprise sequencing means capable of defining said time segments, and which control a switch, connected so that the transmission of the reception means are coupled to the transmission channel only during the transmission time segments.

In a preferred embodiment, the starting instants, and the end of transmission instants, are chosen randomly. However, the sequencing means are arranged to define a mean recurrence of the transmission start instants. Thus the transmission time segments have a rate which is random but centred around a mean rate. The reception time segments for their part are complementary to the transmission segments so that the reception starts substantially when the transmission ends. Preferentially, the reception time segments have a mean duration substantially identical to the mean duration of the transmission segments.

BRIEF DESCRIPTION OF THE DRAWINGS

Other characteristics and advantages of the invention will emerge from an examination of the following detailed description, given by way of example, and the accompanying drawings in which:

FIG. 3A depicts in more detail the signal generator and reception processing circuit of the on-board and ground devices of FIG. 1, FIG. 3B depicts the signal generator and reception processing circuit of the on-board and ground devices, permitting an exchange of four signals e1, r1, e2 and r2.

DESCRIPTION OF AN EXEMPLARY EMBODIMENT

The following detailed description and the drawings related thereto contain essentially elements of a certain character. The drawings can therefore not only serve to give a better understanding of the invention but also contribute to its definition, where necessary.

It is considered hereinafter that the device according to the invention is applied to the precise measurement of a time difference between two distant atomic clocks. The precision required for this measurement is around 1 picosecond. The two atomic clocks H1 and H2 are for example cooled caesium clocks.

Figure 1:
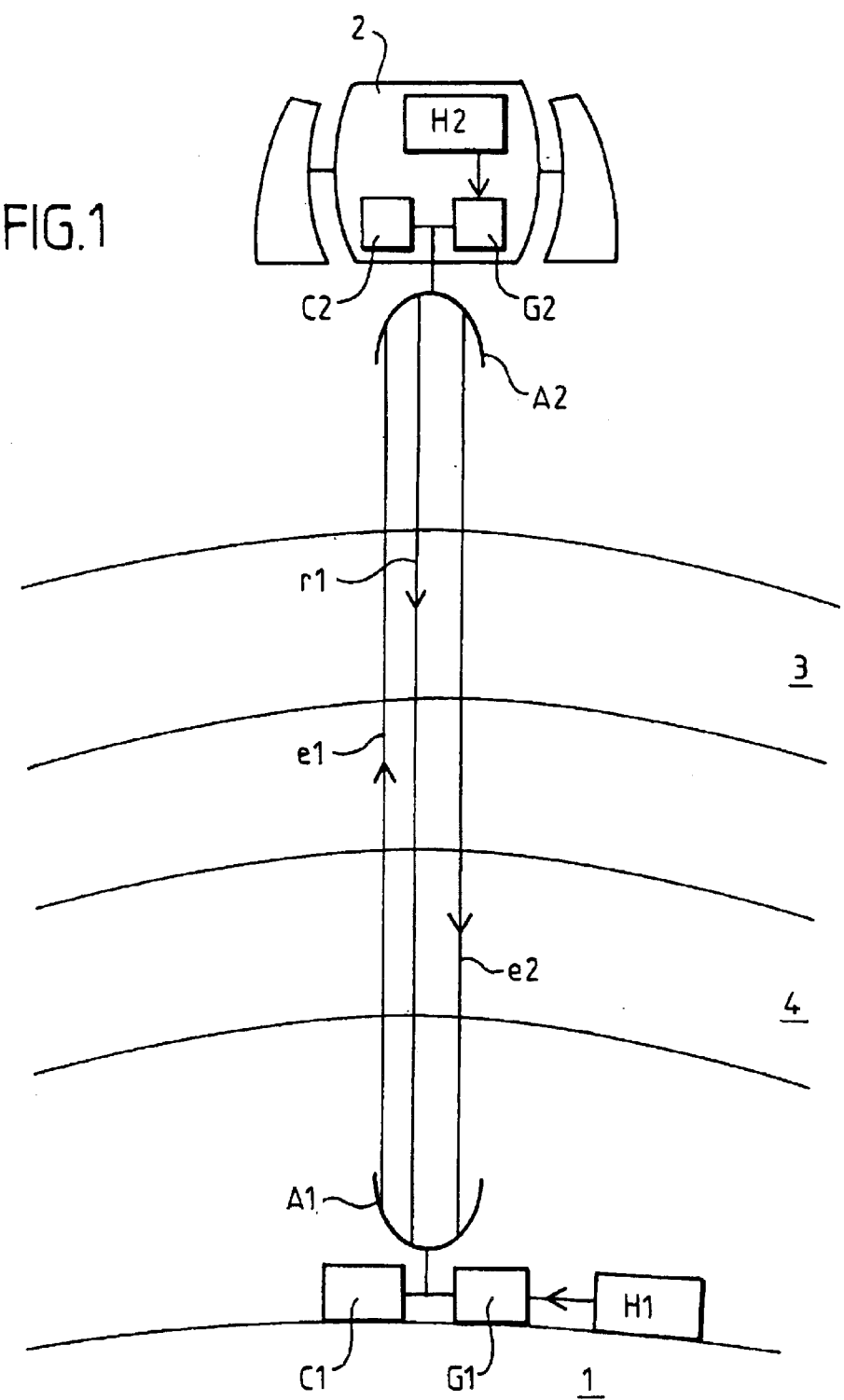
FIG. 1 depicts schematically an exchange of three signals between a ground station and a station in orbit.

As shown in FIG. 1, the clock H2 is on board a satellite 2 in low orbit. The other clock H1 is on the ground. This is the context of the experiment on a satellite known as "alpha station".

Conventionally, the measurement of the difference between a distant clock and a local clock is effected optically. A pulsed laser beam is used, generally with a wavelength of around 532 nanometers. However, the absorption and diffusion of this beam by clouds in the atmosphere mean that the reception processing conditions are not always correct.

In order to mitigate this drawback, it can be envisaged proceeding with an exchange of signals within the radiofrequency range, liable to undergo less absorption and/or diffusion than an optical beam.

The measurement of the difference between a distant clock and a local clock by radio method is more complex: it is necessary to exchange at least three signals. For example, in order to in measure on the ground the time of the clock H2 (or onboard time), these three signals are:

a signal e1, derived from H1, which the station on the ground 1 transmits, a signal r1, derived from e1, which the station in orbit 2 (or alpha station) returns, and a signal e2, derived from H2, which the alpha station 2 transmits.

The chosen carrier frequency is for example around 13.5 GHz. Any other frequency may suit provided that it is little absorbed by a cloudy atmosphere. The problem is that a radiofrequency link between the ground and a satellite in orbit suffers propagation interference due to passing through certain atmospheric layers. For example, the ionosphere 3 (FIG. 1) causes, compared with the theoretical propagation in a straight line, an extension of the transit time, or delay, which is substantially inversely proportional to the square of the frequency, and therefore dispersive. For a carrier frequency of around 10 GHz, this extension may, at oblique incidences, reach a few nanoseconds (a few tens of centimeters in equivalent distance). The troposphere 4 also causes a delay, but one which depends only slightly on the carrier frequency.

In order to overcome the dispersive effect of the ionosphere on carriers in the radiofrequency range, an appropriate choice of three distinct carrier frequencies can be made, making it possible to effect the exchange of the signals (see for example the article "Performance Data of Space and Ground Hydrogen Masers and Ionospheric Studies for High-Accuracy Comparisons between Space and Ground Clocks", R F C VESSOT & M W LEVINE, Proc. of the 28$^{th}$ Annual Symp. on Freq. Contr., Ft. Monmouth, N.J., 1974, pp. 408–414). Typically, there exists a mathematical relationship between the three carrier frequencies, but it is generally difficult, or even impossible, to obtain an allocation of frequencies covering three different frequencies required by this method. In addition, the exchange of signals on three different carrier frequencies requires the use, for each station, either of an antenna with a very broad band, or at least three antenna whose relative positions are perfectly controlled (as far as the level of the phase centre).

The present invention therefore proposes the exchange of at least three signals with the same carrier frequency, chosen in the radiofrequency range, and carrying time markers, in principle periodic, linked on each occasion to the times to be transmitted. The transmission on three channels of the same frequency, substantially at the same instant, makes it possible to compensate for the propagation interference, as will be seen.

In a station, the transmission time is associated with a local time marker. This expression "time marker" covers the time marker itself. It also covers any time signal related in phase and frequency to this time marker: such a signal is said to be "synchronous" of the time marker; their respective frequencies are in a ratio equal to a rational number.

The reception of each signal comprises the setting of a local time marker to the time marker received. If the carrier is linked in time to the time marker which modulates it, this setting is made more precise by using the phase of the carrier, as received. This provides a "measurement of the reception time".

In one example, the distant station is a satellite in low orbit, typically between 300 km and 1000 km above the ground (non-geostationary). The satellite station is frequently occulted, the periods of visibility of the satellite at a given terrestrial point being at most approximately 300 seconds, over several passages spaced apart by approximately 90 minutes, for an orbit at a mean altitude of 300 km.

In FIG. 1, the antenna A2 of the satellite station 2 transmits a signal e2 in the direction of the ground station 1. The antenna A1 on the ground transmits the signal e1, which is sent back (r1) by the satellite antenna A2. Antennae A1 and A2 are preferentially chosen with a bandwidth equal to approximately 10% of the centre frequency. In a more particular example, the antenna A1 on the ground is a parabolic antenna pointed towards the satellite, whilst the satellite antenna A2 is a four-wire helix with an angle of opening of approximately 60°. Advantageously, the polarisation of the electromagnetic waves used is circular or, more generally, elliptical.

The following are therefore known, in the ground station:

the time of transmission of the signal e1, the time of reception of the returned signal r1, and the time of reception of the signal e2.

The two signals e1 and r1 are considered to be reference signals. For the moment the internal time differences of the electronic circuits are disregarded, in particular the difference encountered at the other end in order to recreate the signal r1 from e1 as received; it is possible in fact to know or correct these differences, as will be seen later.

The time difference between the time of transmission e1 and the time of reception of r1 is equal to twice the propagation time over the ground/orbit distance (including the effect of the aforementioned propagation abnormalities). This time difference is denoted by $2*T_{er}$. It is measured modulo Tsi, where Tsi is the period or "epoch" of the time markers used.

For its part, the reception time $T_{e2}$ of the signal e2 carries the information on the time of the clock H2 in orbit, increased by one times the propagation time over the ground/orbit distance (including the effect of the aforementioned propagation abnormalities). The time $T_{e2}$ is also measured modulo Tsi.

A person skilled in the art will understand that the quantity $T_{e2}-T_{er}$ carries only the time of the distant clock H2. There is thus access to the difference between the local clock H1 and the distant clock H2.

The Applicant was confronted with several difficulties, in order to implement the signal exchanges on the same carrier frequency.

First of all, because of the high amplification required in reception, it is impossible in practice to receive and transmit simultaneously on the same carrier frequency, and at the same point. For each antenna, the invention provides for the transmissions and receptions to be distributed over respective separate time windows (or time segments).

It is relatively easy to measure the time difference between two distant clocks when this difference can be monitored continuously, by means of permanent links between the stations. However, since the transmissions and receptions of the signals are intermittent, it is difficult to access the time difference between two distant clocks by monitoring only the phase difference between these two clocks from a common reference point, having regard to the variation in the ground-satellite distance, and any small differences between the clock frequencies.

It is also known that the time measurements are a priori subject to an intrinsic ambiguity, equal to the period of the time marker used.

However, there is also a difficulty at another level, which persons skilled in the art of radar sometimes refer to as "pulse to pulse ambiguity": a series of transmitted pulses are considered and returned pulses coming from the sending back by a distant object of the transmitted pulses; when the outward and return transit time is less than the period between pulses, any return pulse results from the transmitted pulse immediately preceding it; the situation is different in the contrary case; and it can happen that the return pulse coincides with a transmitted pulse, which makes it unusable. The Applicant has observed that this "masking" effect is a great nuisance in chronometric applications.

The invention provides for:

the antennae A1 and/or A2 to transmit every 100 $\mu$s on average, and the transmission time windows to have positions and/or durations which have a random component, with preferably a duration of approximately 50 $\mu$s on average. This can be achieved by randomly fixing the start and/or end times of the transmission time windows.

For its part, reception takes place during the time windows which are on average substantially complementary of 100 $\mu$s. Thus the reception time windows also have a random duration, equal to a little less than approximately 50 $\mu$s on average, as will be seen.

By means of the transmission and reception of the signals in windows with random respective time positions, periodic masking of the reception by the transmission is avoided.

Also by making the duration of the transmission windows random, it is avoided having the spectrum of the received signals comprising peaks which are excessively marked and close to the carrier residue. In other words, the spectral density of the received signals is spread out, and the detection conditions for the carrier Fp are improved thereby.

In practice, in order to manage the transmission and reception priorities, the signal exchange devices have a switch SW1 (or SW2) with three ways: transmission, dead time, reception (FIGS. 3A and 3B). This is because, between transmission (50 $\mu$s on average) and reception (48 $\mu$s on average), 2 $\mu$s are reserved for dead time, which makes it possible for example to avoid reception of a signal reflected prematurely by an aircraft.

Figure 4:
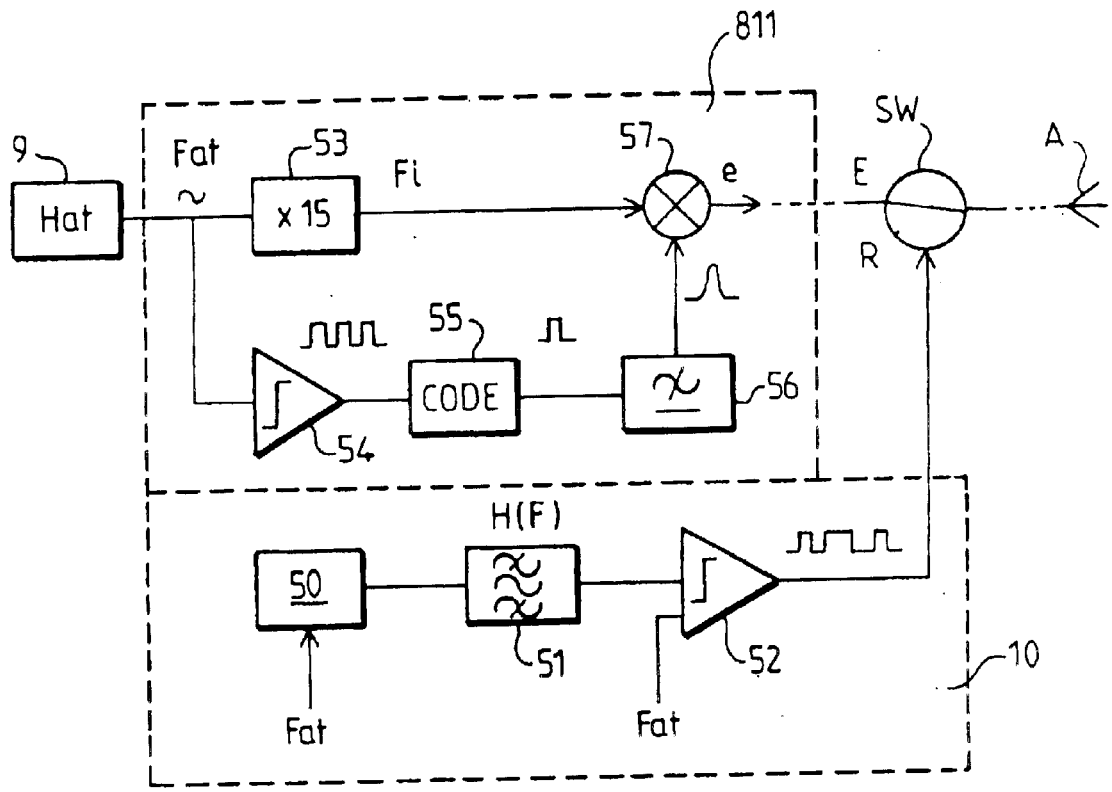
FIG. 4 depicts partially in the form of a circuit an example embodiment of a generator generating signals to be transmitted, having sequencing means of the aforementioned type.

The switch SW is controlled by a sequencer, one embodiment of which is illustrated in FIG. 4. It has a gaussien white noise generator 50, followed by a passband filter 51 whose transfer function H(f) is written:

$$H(f) = K \sin^2(\pi\tau f)/(\pi\tau f)$$

where $\tau$ is a function of the mean recurrence of the transmission windows ($\tau$=0.421/Fr) and defines the bandwidth of the filter. At the output of the filter 51, a comparator 52 is provided, whose switching threshold is chosen to refine a mean cycle ratio of $\eta$=50% (50 $\mu$s of transmission on average, to 100 $\mu$s on average).

As a variant, the successive start and end times of the transmission time windows can be defined by means of pseudo-random code generators (or PRN code), or in any other equivalent fashion, including completely random.

It should also be noted that it is not necessary for the distant station to know the variability mode used for the transmission periods and/or positions, since provision is made, reciprocally, for the distant station to transmit for 50 $\mu$s on average and every 100 $\mu$s on average, and to receive the remainder of the time, except for the dead time. Thus reception is not always successful but, statistically, there will always be a sufficient proportion of successful receptions to be able to process the signal received.

The Applicant has also had to confront a second difficulty related to the transmission and reception of two signals at the same time, with the same carrier frequency r1 and e2 (FIG. 1) and on the same channel, as will be seen later.

FIG. 4 is the outline diagram of the generator G generating signals to be transmitted e1 or e2, in a currently preferred embodiment. The atomic clock 9 (or Hat) delivers clock pulses (or pips) with a frequency Fat (typically around 100 MHz). On a first channel, a frequency multiplier 53 forms a signal with an intermediate frequency Fi, here around 1.5 GHz. On a second channel, a comparator 54 delivers a periodic square-wave signal of 10 ns; the transitions of these square waves are considered in one of two possible directions; from there, a sequence generator 55 (CODE) chooses in a pseudo-random fashion, every 80 ns, a pulse start time amongst N possible start times (N=8 in the diagram FIG. 2). These N possible start times are spaced apart by 10 ns, which corresponds to a frequency of 100 MHz, that is to say approximately one fifth of Fi.

The mean rate of the pulses thus generated is around 1.25 MHz. From each pulse, an integrating filter 56 generates a Gaussian pulse with a duration of 10 ns in the example. This Gaussian pulse goes, as a modulation input, to a modulator 57, which receives, as a signal to be modulated, the signal at intermediate frequency Fi of the first channel. The output of the modulator 57 corresponds to the signal e to be transmitted.

The Gaussian pulse train thus generated constitutes a pattern related to the time marker of the sending station. Modulation by pulses whose profile is substantially a Gaussian function advantageously makes it possible to obtain a spectral density which decreases rapidly outside the useful band.

Figure 2:
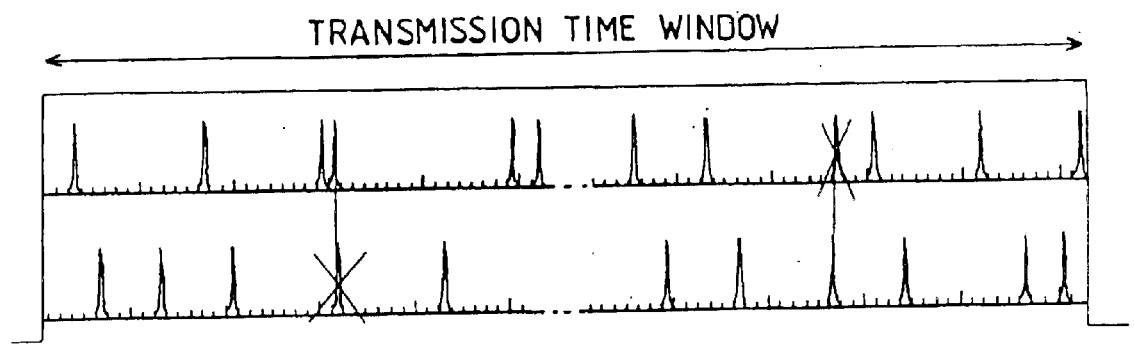
FIG. 2 depicts schematically the appearance of two signals sent over the same channel.

In the example in FIG. 2, the signals generated have a succession of pulses of durations of around 10 ns, every 80 ns. The position in time of each Gaussian pulse is chosen in a pseudo-random fashion on N difference levels (N=8 in the example), spaced apart by 10 ns. The repetition rate of each pulse is on average constant, preferentially around 12.5 MHz. The mean separation between two successive pulses is approximately 80 ns, whilst the maximum separation between these two pulses is approximately 150 ns. In general terms, the positions in time of two successive pulses are separated by a period less than a threshold value, here 150 ns.

Thus:
- the carrier of each signal to be sent is modulated by a series of pulses, each of which has an envelope in Gaussian shape ("Gaussian pulses"),
- these Gaussian pulses all have the same predetermined duration Timp,
- the series of pulses is periodic, with a period Tsi,
- within each period Tsi, the respective time positions of the Gaussian pulses are substantially random, in accordance with a "Pattern" of duration Tsi chosen in advance,
- the pattern is repeated without time discontinuity throughout the period in which transmission is enabled; consequently the generated signals are in the form of a periodic sequence of Gaussian pulses, in which the starting times of the pulses are chosen in a pseudo-random fashion,
- as the generation of the pattern, in the station under consideration, is permanent, the transmitted parts of this pattern remain consistent from one transmission window to the next. In addition, the Gaussian pulses are here "consistent from pulse to pulse", that is to say the phase of the carrier wave is kept over all these pulses (including from one transmission signal to the next).

The series of patterns of period Tsi can be considered to be equivalent to a series of clock pulses of period Tsi. A pip is for example associated with the start of each repetition of the pattern (or any other fixed instant of the pattern, provided that this convention is fixed and known).

The different patterns used are chosen in order to comply with certain conditions:
- correlation between two signals having different pattern gives nothing (only a noise);
- correlation between two signals with the same pattern is a function of the synchronisation between the two signals. It is at a maximum if the position in time of the pattern is substantially the same in both signals (modulo Tsi). This correlation makes it possible to process (to within the ambiguity) a small time difference which is around the width half-way up a Gaussian pulse.

In order, by correlation, to be able to distinguish, in reception, the signals exchanged, it is necessary for the patterns to be known either completely or in the form of a representation which makes it possible to generate them. As the time distribution of the pseudo-random Gaussian pulses is predetermined with respect to a reference time, it is therefore known to create replies to them, for correlation.

As already indicated, the Applicant currently prefers modulation of the carrier wave by pulses of Gaussian waveform and pseudo-random time positions, because of the advantages which they present. However, as a variant, other types of time markers could be used, for example those based on pseudo-random codes, acting in modulation by phase inversion of the carrier (modulation of the BPSK (Binary Phase Shift Keying) type).

Hereinafter, "code" refers to the aforementioned Gaussian distribution pattern, or any equivalent signal.

According to another advantageous characteristic of the invention, two distinct codes are used, one for transmitting the signal e1 or for returning the signal r1, and the other for transmitting the signal e2, these codes being known in reception in orbit and on the ground. Thus each signal exchange has, in addition to its radio frequency carrier, a timer marker linked to a code which can be discriminated by correlation. In order to distinguish the two received signals r1 and e2 on the ground, a correlation in the knowledge of their respective codes is effected by the circuit for processing and reception C1. It should be noted that the transmission powers are situated here above the noise. In addition, durations Tsi close to 10 $\mu$s suffice in this application, which advantageously allows processing times by correlation which are relatively short in reception, typically around 20 s for the onboard receiver of the satellite, as against 2 s on the ground, where the position of the satellite and the phase of its clock are known with a good approximation.

FIGS. 3A and 3B are outline diagrams of the exchanges between the stations on the ground and in orbit, respectively with three and four exchanged signals. These figures illustrate modulators (MOD) and demodulators (DEMOD), which will be described later in detail.

In FIG. 3A, the switch SW1 of the ground station 1 connects the antenna A1 either to the reception processing circuit C1 or to the signal generator G1.

The signal generator G1 comprises the ground clock 91 (or H1), which supplies a frequency F1, in order to control the modulator assembly 811 (or MOD). The latter supplies a signal e1 which, after amplification 200, arrives at the switch SW1. It should be stated that this signal e1 resulted from the amplitude modulation of the carrier frequency Fp by the pattern or code ("on the ground") associated with this signal e1.

The reception processing circuit C1 commences with a reception amplification stage 100, connected to SW1. The output of this amplifier 200 goes to two demodulator assemblies 813 and 814 (or DEMOD), which work respectively on the codes of the two signals e2 and r1. As will be seen subsequently, the processing DEMOD comprises a coherent demodulation of the carrier and a synchronisation of the codes by correlation.

On reception, the propagation time of the wave is manifested both by a shift in time of the pattern and by a phase shift of the carrier. The correlation is effected on predetermined pattern lengths, by means of a measurement of a carrier phase difference, and can give a value of the time difference between the signals r1 and e1 on the one hand and e2 and e1 on the other hand. Next, the comparators 815 and 816 remind symbolically that the time markers of the signals received at the local atomic clock on the ground H1 will be compared.

The switch SW2 of the station in orbit 2 connects the antenna A2 either to the reception processing circuit C2 or to the signal generator G2.

The reception processing circuit C2 commences with a reception amplification stage 100, connected to SW2. The output of this amplifier 200 goes to a demodulator assembly 824, which works on the code of the signal e1 received.

The signal generator G2 comprises the satellite clock 92 (or H2), which supplies a frequency F2, in order to control the modulator assembly 821 (or MOD). The latter supplies a signal e2, whose modulation pattern is distinct from the pattern of e1. Moreover, the output of the demodulator 824 is applied to another modulator 822, in order to establish the signal r1 to be retransmitted. A junction 827 combines the two signals e2 and r1 (preferably with mutual exclusion, as will be seen), in order to apply them to the transmission amplification 200. The signals r1 and e2 are transmitted by the antenna A2 of the station in orbit.

The amplification 200 (in both cases) must be sufficiently linear to prevent phase distortion notably of the carrier, and to absorb variations in gain whilst withstanding the maximum amplitude of the signal (or peak). In addition, in the signal generator G2, two pulses associated respectively with the transmitted signals r1 and e2 may overlap. It may be decided that the first pulse which has arrived has priority and will alone be selected for transmission (diagram in FIG. 2). The simultaneous transmission of two pulses, which can be envisaged as a variant, would require particularly advanced linear characteristics at the level of the amplifier 200 of G2.

Figure 5A:
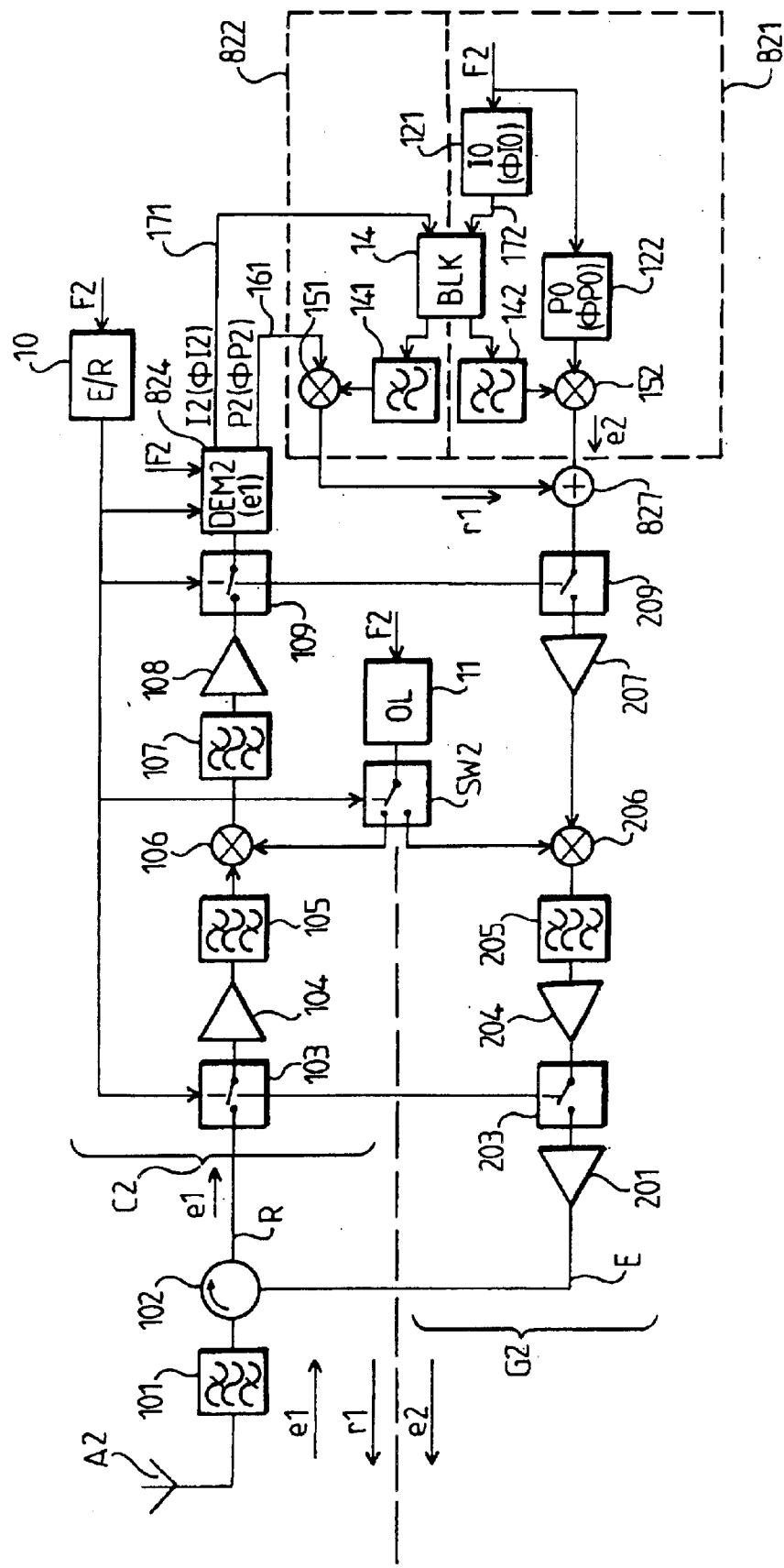
FIG. 5A depicts in more detail an example embodiment of equipment of the station in orbit for exchanging three signals.
Figure 5B:
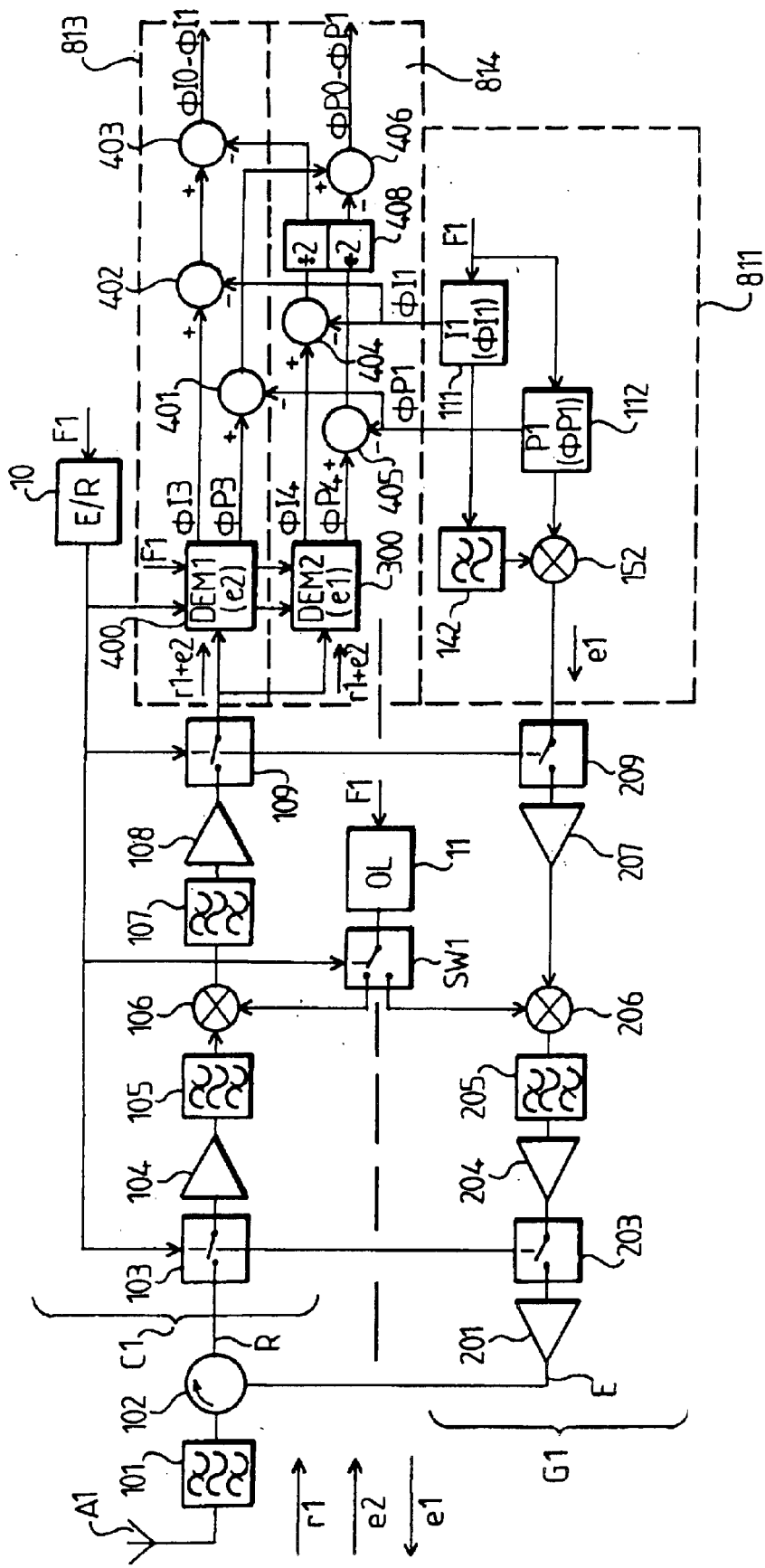
FIG. 5B depicts in more detail an example embodiment of equipment of the ground station, for an exchange of three signals with the station in orbit depicted in FIG. 5A.
Figure 6:
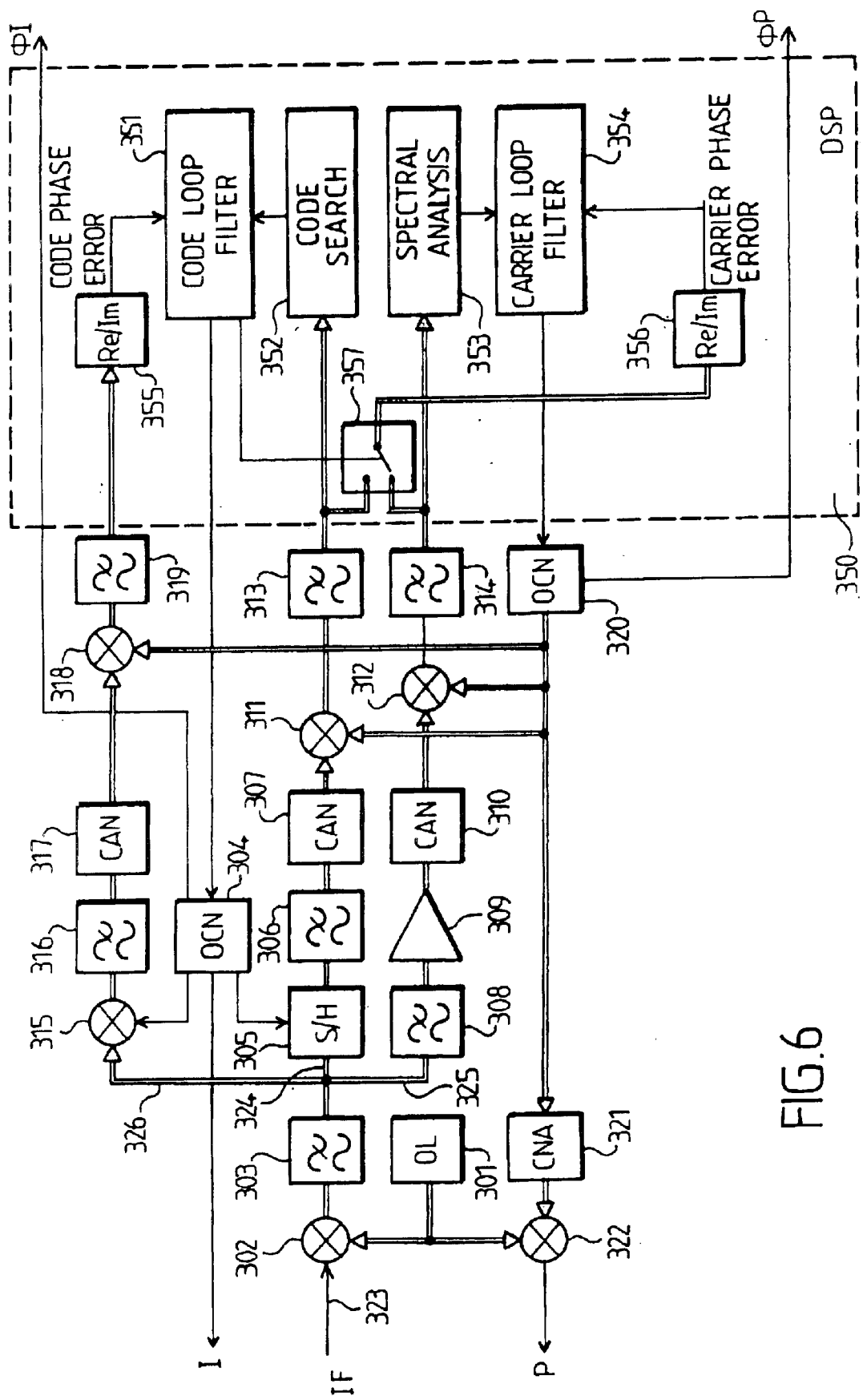
FIG. 6 depicts partially an example embodiment of a demodulator DEMOD provided on the reception channels of the circuits depicted in FIGS. 5A and 5B.

FIGS. 5A, 5B and 6 are detailed diagrams, in the case of three exchanged signals. They differ from the outline diagrams essentially through the intervention of frequency changes, and through the "distributed" implementation of the switchings SW1 and SW2.

FIG. 5A concerns the equipment provided on board the satellite, in the application referred to. The antenna A2 is followed by an antenna passband filter 101, which delimits the useful transmission/reception band, followed by a circulator 102, for separation into two transmission E and reception R channels.

In reception R, the signal e1 passes through the controlled switch 103, and then the amplifier 104, and the passband filter 105, in order to reach the mixer 106, which also receives, through the switch SW2, a frequency signal F2 which delivers the synthesiser 11 of the local oscillator (onboard clock H2). The output of the mixer 106 is restricted to the component Fp-F2 by a passband filter 107. After amplification at 108, the resulting signal is applied to the demodulator 824, which will be dealt with again later. The latter supplies a reconstituted signal I2 (pattern of the pulse train of the signal e1) on the channel 171, and a reconstituted signal P2 of frequency Fp-F2 on the channel 161. The measurements of the respective time positions or "phases" of the signals I2 and P2 are denoted ΦI2 and ΦP2.

For transmission, a signal generator 121 produces a signal I0 of phase ΦI0, having the pattern of a square-wave pulse train (pattern of the signal e2), from a synchronous frequency F2 of the onboard atomic clock H2. Likewise, a signal generator 122 delivers a signal P0 of frequency Fp-F2 equal to the intermediate frequency Fi, and of phase ΦP0. Thus the frequencies and phases of the two components I0 (channel 172) and P0 (channel 173) of the signal e2 are taken from the onboard clock H2.

The two inputs of an anti-coincidence filter 14 receive respectively a reconstituted pulse train I2 (issuing from e1 received) and the local pulse train I0 (pattern e2, issuing from the onboard clock), which come out separately on two outputs, in principle unchanged. However, if two respective pulses of I0 and I2 overlap, the filter 14 eliminates the pulse which is retarded with respect to the other. The two pulse trains I2 and I0 are then applied respectively to integrating filters 141 and 142, in order to form pulses with a Gaussian wave profile. The processed pulse train I2 is modulated at 151 by the reconstituted signal P2, and the processed pulse train I0 is modulated at 152 by the signal P0 of frequency Fp-F2 taken from the onboard clock H2.

The functions of the modulator 822 of FIG. 3A are provided by the elements 141, 151 and the channel I2 of the element 14. The functions of the modulator 821 of FIG. 3A are provided by the elements 142, 152 and the channel I0 of the element 14. It can be considered that the elements 121 and 122 form part of the modulator 821 or, more generally, the generator G2 of FIG. 3A.

At this stage, the output signal of the modulator 151 represents the signal r1, but with a carrier frequency equivalent to Fp-F2. Likewise, the output signal of the modulator 152 represents the signal e2, but with a carrier frequency equivalent to Fp-F2, taken from the onboard clock.

The junction 827 then effects the sum of the two signals output from the modulators 151 and 152. After passing through the switch 209, this sum is amplified at 207, and then mixed at 206 with the other output of the switch SW2, as a local oscillator of frequency F2. The output of the mixer 206 is restricted to the carrier frequency component Fp by a passband filter 205, and then amplified at 204. After passing through the switch 203 and amplifier 201, the signal rejoins the transmission input of the duplexer or circulator 102.

The main switch SW2 is controlled by a transmission/reception sequencer 10, as indicated above, according to the frequency of the onboard clock F2. Preferably switches 103, 203, 109 and 209 are also provided. When the two switches 103 and 109 are closed (open), the switches 203 and 209 are open (closed) and the switch SW2 is connected to the reception channel R (transmission channel E). The sequencer 10 comprises for example the noise generator 50, the filter 51 and the flip-flop 52 of FIG. 4.

A person skilled in the art will understand that the amplifiers 100 and 200 of the outline diagram of FIG. 3A correspond respectively to the series of amplifications 104 and 108 on the one hand and 207, 204 and 201 on the other hand.

In general terms, the signal generator of the orbiting station is able to:

itself generate a transmitted signal e2, whose time marker is set to the local atomic clock H2, and cooperate with the reception processing circuit in order to generate a signal to be returned r1, whose time marker is set to the signal received e1.

The word "set" applies subject to the delays in the processing circuits, which can be determined.

The satellite station of FIG. 5A works with the equipment provided on the ground in FIG. 5B. After the antenna A1 and its filter 101, there are, as in FIG. 5A, a reception channel R and a transmission channel E. The similar elements bear the same reference and will not be described once again. The differences are:

on the one hand that the processed signals are e1 in transmission and r1 and e2 in reception, and on the other hand that the sequencer 10 and local oscillator 11 are defined with respect to the atomic clock on the ground H1.

In the unit 811, the signal generator 111 delivers a signal I1 representing the Gaussian pulse train according to the pattern on the ground and as a function of the frequency F1 of the clock on the ground, and the signal generator 112 delivers a signal P1 of frequency Fp-F1 taken from the clock on the ground. The functions of the modulator 811 in FIG. 3A are provided by the elements 111, 112, 142 and 152 of FIG. 5B. It can be considered that the elements 111 and 112 form part of the modulator 811, or, more generally, the generator G1 of FIG. 3A. A more detailed example of the structure of the modulator 811 is depicted in FIG. 4.

After processing by the passband filter 142, the signal I1 modulates the signal P1 at 152; the result is sent to the input switch 209 of the transmission channel E. The resulting signal represents the signal to be transmitted e1, but with a carrier frequency equivalent to Fp-F1, before the mixing at 206.

For its part, the reception channel R of the ground equipment separates, after the output switch 109, into two demodulation channels 813 and 814 (see also FIG. 3A), including respectively demodulators 300 and 400, with similar structures (FIG. 6). However, the demodulator 300 works on the basis of the pattern of the pulse train transmitted by the ground station, whilst the demodulator 400 works on the basis of the pattern of the pulse train emitted by the orbiting station.

At the output of the demodulator 400, the two channels ΦI3 and ΦP3 deliver the respective reconstituted phases of the pattern of the signal e2 and of the signal of intermediate frequency Fp-F1. At the output of the demodulator 300, the two channels ΦI4 and ΦP4 deliver the respective reconstituted phases of the pattern of the signal r1 and of the signal of intermediate frequency Fp-F1.

At the output of the signal generators 111 and 112, the respective phases ΦI1 and ΦP1 of the pattern of the signal e1 and of the signal of intermediate frequency Fp-F1 (taken from the clock on the ground) are subtracted from ΦI4 and ΦP4 at 404 and 405. These two phase differences are a function of the "outward/return" travel time of the transmitted signal e1. At the output of the dividing operators 407 and 408, the phase differences become a function of an "outward" travel time. Moreover, the subtracting operators 402 and 401 effect in the same way the phase differences between ΦI3 and ΦI1, on the one hand, and ΦP3 and ΦP1 on the other hand. These phase differences take account both of an "outward" travel time and any difference between the two clocks on board and on the ground. Thus the phase differences ΦI0-ΦI1 and ΦP0-ΦP1 and the output of the operators 403 and 406 are now no more than a function of a difference between the clocks.

As, here, the pattern of each signal is linked in phase and frequency to its carrier, the reception processing circuit (demodulators 300 and 400) advantageously effects a refining of the tracking of the pattern by correlation and a phase tracking on the carrier previously detected by spectral analysis, as will be seen below.

Reference is now made to FIG. 6 to describe the detailed structure of one of the demodulators 300, 400 and 824. The example of the demodulator 300 is taken.

Overall, this demodulator receives as an input 323 a signal at intermediate frequency IF. As outputs it has:

on the one hand two signal outputs I (code) and P (carrier),
on the other hand two time position or "phase" measuring outputs ΦI (code) and ΦP (carrier).

The signal at the input 323 of the demodulator is of intermediate frequency Fp-F and has a Gaussian pulse train with a pattern denoted "code". It is applied to a mixer 302 (synchronicity modulator), also receiving the output of a local oscillator (synthesiser) 301, set to the local clock. The output of the mixer 302, after low-pass filtering at 303, is a complex (double line) signal, practically in base band.

The initialisation or acquisition takes place by means of a first carrier channel 325, where the base band signal is averaged (308, 309), and then converted into a digital signal by the analogue to digital converter 310. The averaged signal is mixed, at 312, with a signal which is delivered by the oscillator with digital control 320. After the mixing 312, a low-pass filtering is provided at 314, and then a spectral analysis at 353.

It has been seen that the spectral analyser 353 makes it possible to take account of the carrier frequency of the signal received, including Doppler effect (Fp±2Δv). The Applicant has observed in fact that this Doppler effect comprises a component specific to the application because of the movement of the satellite 2. For a radio carrier frequency of approximately 13.5 GHz, the result is a relative difference in frequency which is in this case around $2.10^{-4}$. This too is corrected according to the invention.

The spectral analysis therefore makes it possible to preposition the carrier loop filter 354 on the carrier (shifted according to the frequency change), and having regard to the total Doppler effect. This loop filter digitally controls a digital control oscillator 320, whose output goes to the mixer 312 already mentioned, to other mixers 311 and 318, and to a digital to analogue converter 321.

After prepositioning of the carrier loop filter 354, there is obtained at the output of the mixer 312 and its filter 314 a complex carrier phase error quantity which, in the depicted position of the switch 357, acts on the member 356 in order to apply the error quantity to the loop filter 354, thus closing the loop, and which consequently corrects the digital control of the oscillator 320. The member 356 produces the phase error in the form of the ratio of the real part to the imaginary part of the complex carrier phase error quantity.

The carrier loop being closed, the representation of the carrier becomes analogue once again at the output of the converter 321. After mixing at 322 with the local signal of 301, the carrier signal P is obtained. The oscillator 320 also supplies the digital carrier phase measurement ΦP.

In addition, a code loop filter 351 digitally controls a digital-control code oscillator 304, whose two outputs supply the code signal I and the digital measurement of the code phase ΦI.

However, this oscillator 304 also controls a sample and hold unit 305, placed at the head of the second carrier channel (commencing at 324), which comprises a low-pass filter 306, an analogue to digital converter 307, the aforementioned mixer 311 with its output of 320, and its filter 313.

In a known manner, a stage 352 acts by prepositioning tests on the filter 351, in order to seek a commencement of correlation between the local code and the received code. As soon as the correlation commences, the carrier sampling 305 takes place in synchronism with the Gaussian pulses. Hence the presence of a significant signal at the output of the filter 313, which informs the unit 357 of the start of synchronism.

As from this moment, the code channel, which commences at 326, can operate. In addition, as soon as the code synchronism is sufficient, the filter 351 causes the switch 357 to switch, so that the error quantity of the carrier loop filter 354 is now supplied by the second carrier channel, whose signal to noise ratio is better.

The code channel comprises a mixer 315 with the output of the digital-control code oscillator 304, its filter 316, an analogue to digital converter 317, the aforementioned mixer 318 with the output of 320, its filter 319, and finally the member 355 which, like the member 356, produces a code phase error in the form of the ratio of the real part to the imaginary part of the complex code phase error quantity, and takes over controlling the loop filter 351.

The elements 351 to 357 are preferably implemented in a module 350, which is for example of the controlled-time digital signal processor (DSP) type.

The time constants of the loops of the demodulator are here around ten milliseconds. Advantageously, the mean frequency of the starting times of the transmission time windows, 10 kHz in the example described, is sufficient to enable the loops to work on several reception time windows.

In addition, the processing time for formatting the signal r1 to be returned can be calculated by the ground station and taking into account. The estimations of ΦI4-ΦI1 and ΦP4-ΦP1 (FIG. 5B) take account of this processing time as if the signal r1 corresponded to a signal e1 reflected without time difference.

In this mode of operation of the orbiting station/ground station system, the exchanges of signals take place by transmission/reception of three signals with the same frequency, and it is possible to deduce only the onboard time (clock H2) on the ground.

Reference is now made to FIG. 3B in order to describe a system consisting of orbiting station and ground station making it possible to obtain both the onboard time (clock H2) on the ground, and the ground time (clock H1) on board. The two devices, onboard and on the ground, are arranged to operate substantially symmetrically. Each station has an antenna A connected to a three-position switch SW. Their reception processing circuit C is equivalent to the circuit C1 of the ground station depicted in FIG. 3A, whilst their signal generator G is equivalent to the signal generator G2 of the orbiting station depicted in FIG. 3A. Their structure will therefore not be described in detail. The two stations exchange four signals e1, r1 and e2, which correspond to the three signals exchanged previously, as well as a fourth signal r2 which corresponds to the signal e2 returned by the ground station to the orbiting station. The comparison of the signals e1, r1 and e1, e2 (code and carrier phases) makes it possible to access the onboard time, and a comparison of the signals e2, r2 and e2, e1 makes it possible to access the ground time.

In the example depicted in FIG. 3B, the ground station and satellite station are similar, but not identical. In more general terms, the reception processing circuit on the ground is arranged to selectively distinguish by correlation and tracking the pattern related to the time marker of the signal received and the pattern related to the time marker of a second signal to be received. In the application referred to, the second signal to be received corresponds to the signal sent by the device, and returned by the source of the said received signal. This makes it possible to obtain the time difference between the two time markers by compensating substantially for the instantaneous propagation time differences.

Instead of returning the signal received by retransmission, it would be possible to proceed by reflection, for certain applications where signal loss by reflection can be tolerated.

Naturally, the present invention is not limited to the embodiment described above by way of example. It extends to other variants.

Thus it will be understood that, in the context of a ground/orbit link by exchanging three signals, it may be desired to measure the ground time (clock H1) on board. In another operating mode, the orbiting station then sends a signal e1, returned (r1) by the ground station which itself sends its own signal e2. In this case, the device on the ground (in orbit) has characteristics similar to those of the device in orbit (on the ground) described above.

In the example described, the signal exchanges take place between a station in orbit and a station on the ground. As a variant, these signal exchanges can take place between two stations on the ground or between two stations in orbit, the assembly possibly including a relay station in orbit or on the ground, where necessary.

Provision can also be made for an exchange of signals between several stations in orbit or on the ground. If n is the number of stations linked, the number of signals exchanged becomes 2n+1, and the number of patterns or codes to be provided is n+1.

In more general terms, the present invention also clearly relates to a device of the type described above, onboard or on the ground, and for the exchange of three or more signals, with the same carrier frequency.

The values of carrier frequency, code frequencies, passbands, pulse sampling periods, etc, are given here by way of example; they may be modified in a variant of the device according to the invention. Moreover, several passages through successive intermediate frequencies (Fp-F) can be provided for in the transmission and reception processing, if the relevant application so requires.

In the example described, the carrier of the signals generated is amplitude modulated by waves with a substantially Gaussian form. This modulation is advantageous in terms of spectral size. However, it is described here only by way of example.

In addition, the pseudo-random distribution of the starting times of the Gaussian pulses is also described by way of example. As a variant, other different codings, for example in pseudo-random amplitude modulation, can also be envisaged. The amplitude of the carrier can thus be modulated by a bit stream of predetermined length, and where the value of each bit is taken randomly between 0 and 1. Preferably, the probability of occurrence of the bits of the code at 1 must be chosen so as to be less than 50%, notably in order to limit the overlaps of two pulses in transmission. In more general terms, other types of code similar to a noise can be provided. However, it is necessary for this noise to be known in reception, and therefore able to be defined by a message of finite length.

In the example described, it is thought to measure a time difference between atomic clocks with cooled atoms. In more general terms, the device according to the invention can be applied in order to determine precisely the time of any time event, able to be represented by a periodic signal.

The circuits depicted in FIGS. 4, 5A, 5B and 6 are given here solely by way of an example embodiment of a device according to the invention. In addition, FIGS. 3A and 3B, although more general, also allow variants.

However, many aspects described are interesting in themselves, for the advantages which are inherent in them, independently of other characteristics of the invention.

The present invention can also be manifested in the form of a method for the exchange of radio signals defined by a carrier provided with a time marker. It can be considered that the first step of this method consists of providing transmission/reception means of the aforementioned type. According to the invention, these transmission/reception means are capable of working on the same carrier frequency in transmission and in reception, and the method also includes a step which consists of defining time segments of the aforementioned type. Transmission is then enabled only during these time segments, whilst reception is enabled only outside these same segments.

In the preferred embodiment, described above, of the device according to the invention, the times of start and end of transmission are chosen in a random fashion. The sequencing means are however arranged so as to define a mean recurrence of the transmission start times.

However, the sequencing means can, in a variant, work from a division of the time into consecutive time intervals, of durations always greater than the duration of the transmission segments. It is in each of these time intervals that it is possible to define the random position of a time segment. Preferentially, the duration of the time intervals is predetermined whilst the duration of the transmission time signals is random. In this case, the transmission time segments once again have a random rate, centred around a mean rate which is then defined by the step of the aforementioned intervals.

In another variant, provision can be made for transmission time signals of predetermined durations, for example of durations identical from one transmission to another, whilst preserving transmission start times chosen randomly in intervals of the aforementioned type.

However, the random choice of the transmission start and end times, according to the preferred embodiment described above, advantageously makes it possible to attenuate the amplitude of beat lines related to the mean recurrence of the transmission (10 kHz in the example described).

While the invention has been described and illustrated by way of a preferred embodiment of the invention, it will be understood by those skilled in the art that various changes in form and detail may be made without departure from the spirit and scope of the invention as defined in the appended claims.

What is claimed:

1. Apparatus for exchanging radio signals provided with time markers comprising radio transmission means having a generator to generate a transmission signal, comprising a carrier and a repetitive time marker, reception means having a reception processing circuit for processing a received signal, said received signal comprising a carrier and a repetitive time marker, the radio transmission and reception means transmitting and receiving, respectively, the same carrier frequency signal, and sequencing means to define separate time segments with substantially random successive positions to control the transmission and reception means enabling transmission only during said time segments, and enabling reception outside the segments, whereby the time markers may be processed without any recurrent effect of the transmission signal masking the reception of the received signal.

2. Apparatus according to claim 1, wherein the time segments have a random rate, centered around a mean rate.

3. Apparatus according to claim 1, wherein the sequencing means produce time segments, for controlling transmission and reception, to have substantially equivalent respective mean durations.

4. Apparatus according to claim 1, wherein the sequencing means are arranged to repetitively define each time segment and its random position in an interval of time.

5. Apparatus according to claim 4, wherein the time interval durations are predetermined whilst the time segments durations are random and less than the time interval durations.

6. Apparatus according to claim 5, wherein the duration of each said time segment is on average equal to approximately one half of that of the time interval.

7. Apparatus according to claim 1, wherein the time marker of received signal is linked to a pattern which can be discriminated by correlation.

8. Apparatus according to claim 7, wherein the time marker of the transmission signal is linked to another pattern which can be discriminated by correlation.

9. Apparatus according to claim 7, wherein said reception processing circuit is arranged to selectively distinguish by correlation and tracking the pattern linked to the time marker of said received signal and the pattern linked to the time marker of a second received signal.

10. Apparatus according to claim 9, wherein said second received signal corresponds to said transmission signal sent by the device and returned by the source of said received signal, whereby the time difference between the two time markers is obtained compensating for the instantaneous propagation time differences.

11. Apparatus according to claim 7, wherein the time marker of each signal is linked in frequency and phase to the carrier of this signal, and in that the reception processing circuit has a pattern tracking by correlation and a phase tracking on the carrier with a prior spectral analysis.

12. Apparatus according to claim 1, wherein said received signal is returned to a source producing said signal.

13. Apparatus according to claim 12, wherein the pattern of the returned signal is substantially equal to the pattern of said received signal.

14. Apparatus according to claim 13, wherein the signal generator is able to cooperate with the reception processing circuit in order to generate said signal to be returned which is equivalent to the signal received.

15. Apparatus according to claim 14, wherein the time markers of the return signal and of the signal to be sent are linked to distinct patterns, which can be discriminated by correlation.

16. Apparatus according to claim 7, wherein the carrier of each signal generated is modulated according to a chosen pulse shape, whose repletion is defined according to a pattern which can be discriminated by correlation of this signal.

17. Apparatus according to claim 16, wherein the carrier is modulated according to a substantially Gaussian pulse shape.

18. Apparatus according to claim 16, Wherein the pulses are substantially of the same chose duration and with substantially random respective time positions.

19. Apparatus according to claim 18, wherein the positions in time of two successive pulses are separated by a period less than a threshold value, and on average are separated by a period substantially equivalent to one half of said threshold value.

20. Apparatus according to claim 1, wherein the said carrier frequency is within the gigahertz band.

21. Apparatus for the radio transfer of chronometric information comprising:

(a) a plurality of separated radio stations;

(b) each station having means for transmitting radio signals and means for receiving return signals from another of said radio stations, of the same frequency as said radio signals and having at least one antenna for transmitting the signals from the transmitting means and for conveying return signals from said another radio station to the receiving means;

(c) wherein said transmitting and receiving means of each radio station exchange signals having a common carrier frequency between said stations; and (d) said transmitting and receiving means having sequencing means enabled to define separate time segments with successive random positions, and to enable transmission of said transmission signals during said segments and reception of said return signals outside said segments.

* * * * *